United States Patent [19]

Esdaile et al.

[11] 4,043,802

[45] Aug. 23, 1977

[54] CONTINUOUS REFLUX REFINING OF METALS

[75] Inventors: James Durie Esdaile, Glen Waverley; Graeme William Walters, Mount Waverley, both of Australia

[73] Assignee: Commonwealth Scientific and Industrial Research Organization, Campbell, Australia

[21] Appl. No.: 616,816

[22] Filed: Sept. 25, 1975

[30] Foreign Application Priority Data

Sept. 30, 1974 Australia .............................. 9067/74

[51] Int. Cl.² .............................................. C22B 7/00
[52] U.S. Cl. ..................................... 75/63; 75/65 R; 75/68 R; 75/78; 75/85; 75/86
[58] Field of Search ..................... 75/63, 78, 68 R, 85, 75/86, 65 R

[56] References Cited

U.S. PATENT DOCUMENTS

| 3,840,364 | 10/1974 | Flemings et al. | 75/63 |
| 3,960,548 | 6/1976 | Varotto et al. | 75/63 |

Primary Examiner—M. J. Andrews

Attorney, Agent, or Firm—Cushman, Darby & Cushman

[57] ABSTRACT

A method is provided for the continuous purification of an impure metal in a column consisting of a slurry of metal crystals in liquid metal, said column having a relatively hot zone and a continuous temperature gradient between said zones; the temperature of the cool zone being such as to permit coexistence of liquid and crystalline metal, and said hot zone being at a temperature sufficient to melt the crystals. A portion of the column in the said cool zone is chilled to form a coherent mass of crystals of the metal; then incipient melting in the mass is allowed to occur to release crystals from the mass into the column of the crystals in the liquid metal in the cool zone of said column. The crystals are transported through the temperature gradient and into the hot zone, wherein melting of the crystals occurs and the hot zone thereby becomes enriched with the pure liquid metal.

In normal operation, impure feed metal is supplied to the column; purified liquid metal is withdrawn from the hot zone; and impurity-enriched metal is withdrawn from the cool zone.

18 Claims, 5 Drawing Figures

CONTINUOUS REFLUX REFINING OF METALS

This invention relates to a method and apparatus for the continuous refining of metals or other crystalline substances. Although the greater part of the following description will relate to metal refining, it will be appreciated that application of the principles disclosed herein to the purification and refining of other crystalline substances is within the scope of the invention described.

The prior art (see Arnold et al U.S. Pat. Nos. 2,540,977, Re 24,038, 2,540,083; McKay et al in "Chemical Engineering Progress", 62, 104–112, (1966) and elsewhere) shows the use of a reflux refining for the purification of low-melting organic substances wherein a slurry of the crystalline substance produced by preliminary chilling of the liquid substance is fed into the top or central portion of a column which is heated at the base and has provision for removal of the purified liquid substance from the base of the column and for recycling the impurity enriched liquid from the top of the column.

Such a process is not directly applicable to the purification of metals or other relatively high-melting materials. One approach to this problem is a process for refining metals, organic compounds and other substances which comprises cooling the top of a column of the liquid substance to form crystals of the substance and allowing the crystals to fall through a temperature gradient to the base of the column where they are converted to liquid by heating. Part of the liquid formed was accepted as final product, while the remainder (reflux) was displaced upwards by the descending crystals, thereby to cause the impurities present in these to pass into the reflux liquid, and also, by a washing action, to displace and absorb the impurities associated by entrainment in, and attachment to, the crystals. Such a process, referred to as "reflux refining", has three main criteria which must be met for satisfactory operation: Firstly, the crystals are made in the cold region and transported to the hot region at which almost all of the heat input into the column is supplied. Secondly, a greater weight of crystals is formed than that of the feed added, in order to allow for the use of liquid reflux; the extent of the reflux is equal to the weight of crystals made less the amount of pure product taken from the hot region. Thirdly, the composition of the alloy to be refined must be hypoeutectic with respect to the pure metal being sought.

A further necessary condition for successful reflux refining is that the column must be maintained full of a slurry of crystals at all times during operation.

In our aforementioned copending application, we also described specific methods for forming the crystals, which involved chilling the liquid medium by contact with cooled fluid or a cooled surface of a rigid body to which the crystals were non-adherent. In each case continuous production of the crystals was envisaged.

In practice it has proved difficult to find suitable fluids which will allow operation of our previously described process in metal refining. Difficulties have also been encountered in finding suitable solid surfaces to which nonadherence of metal crystals can be reliably achieved.

We have also found that there are substantial advantages to be gained by modifying the techniques of crystal production which we have previously described. In particular, we have now found that metal crystals of size, shape and composition suitable for reflux refining can best be produced by partial melting of a previously formed mass of the crystals which has been produced by chilling a part of the liquid contained in the column.

According to the present invention, there is provided a method for the continuous purification of an impure metal which comprises providing a column consisting of a slurry of metal crystals in liquid metal, said column having a relatively cool zone and a relatively hot zone and a continuous temperature gradient between said zones; the temperature of the cool zone being such as to permit coexistence of liquid and crystalline metal, and said hot zone being at a temperature sufficient to melt the crystals; chilling a portion of the column in the said cool zone to form a coherent mass of crystals of the metal then allowing incipient melting in the mass to occur to release crystals from the mass into the column of the crystals in the liquid metal in the cool zone of said column; transporting the crystals through the temperature gradient and into the hot zone, wherein melting of the crystals occurs and the hot zone thereby becomes enriched with the pure liquid metal.

For most practical applications, the method also includes the steps of supplying impure feed metal (in liquid, slurry or solid forms as described hereinafter) to the column and continuously withdrawing a portion of the liquid metal from the hot zone.

To attain the maximum benefits from the method of the invention, it is necessary that the crystals be small in relation to the column diameter. For this reason it is highly desirable that the massive solid metal which is melted to form the crystals should consist of small crystals of relatively purer metal in a matrix of a relatively less pure lower melting point material. Such a structure is exhibited by metals which exhibit the phenomenon of micro-segregation during solidification. Microsegregation occurs whenever the first parts of the solid nuclei which form from the melt are of higher melting point than those parts which form subsequently. The phenomenon is associated with the presence of impurities which are sometimes present in crude metals before refining and will be well known to those skilled in the art. For example the presence of bismuth, tin and silver in lead bullion, and copper and silicon in aluminium, give rise to a form of micro-segregation known as dendritic segregation in which the higher melting, purer metal crystallizes in the form of dendrites with a pine-tree structure and the lower melting, less pure material occupies the inter-dendritic volumes.

Some impurities have a pronounced effect in modifying the size and shape of the dentritic crystals, and we have discovered that these modifying impurities can be used to produce, initially, a fine dendritic structure which subsequently breaks down to yield a crystal of a favourable size and shape for enhanced purification by reflux refining. For example the addition of a trace of sodium to aluminium containing silicon as an impurity, or the addition of approximately 0.5% tin or a lesser proportion of silver to lead containing bismuth as impurity, produces a suitable modification of the dendritic structure which favourably affects the refining of these metals.

If the appropriate impurity or modifying metal or metals are not present in the metal feed, it will be necessary to add the impurity metal or metals to the feed or, less preferably, by adding the impurity metals to the cool zone (usually near the top of the column) during the crystal forming operations.

According to one embodiment, the invention provides a method for carrying out reflux refining of impure metals in a column which contains a slurry of suitable metal crystals and liquid metal, and which has a temperature gradient along its length, wherein crystals of suitable size, shape and composition are generated within the column by chilling the contents of the column near the cooler end of the column to form a coherent mass of crystals then allowing incipient melting in the mass to occur to release crystals from the mass into the column; the crystals are transported axially towards the hotter end of the column, thereby causing a displacement of liquid metal in the opposite direction to the movement of crystals; purified liquid metal is withdrawn from the hotter end of the column, while a smaller proportion of a liquid alloy enriched in impurities is withdrawn from the cooler end of the column; the feed metal being added at the cooler end or at an intermediate point in the column.

Preferably, the crystals in the slurry are generated by partial remelting of the crystalline mass produced by chilling of a liquid metal containing impurities which give rise to dendritic segregation on freezing to produce interdendritic volumes of a lower melting alloy composition which melts during the partial remelting step to release solid crystals of slightly higher melting point into the column.

According to one aspect of the invention, the crystals are produced by introducing into the cooler part of the column a massive body of the feed metal, preferably in the form of an ingot. Such an ingot preferably consists of the feed metal and has a microsegregated structure as already described. The cold metal body causes chilling of liquid in the column in the vicinity of the body, thereby producing a coherent mass of crystals which adhere to the metal body. As the body becomes heated, by the combined effects of heat transfer from the column and release of latent heat of solidification which accompanies the freezing process, the crystal mass undergoes incipient melting, as described above, and the crystals are released into the column.

Preferably, the solid feed metal is introduced in the form of discrete ingots at intervals so that the introduction of each ingot causes production of crystals by chilling as already described and then the ingot itself is in turn partially remelted to release further crystals, and to provide all or part of the feed metal to the column.

It is also within the scope of the invention to introduce the impure feed metal in the form of a continuous ingot, whereby the stages of crystal formation, by chilling and partial remelting of the column liquid, and subsequent partial remelting of the ingot occur successively as the ingot progresses into the column.

In a combination of these two approaches, a continuously cast ingot may be introduced into the column in a stepwise fashion.

According to another aspect of the invention, the column liquid is chilled to provide crystals by an intrusive cooling element immersed in the liquid column, and/or, less preferably, by cooling the external surface of liquid column, e.g., by a cooling jacket.

The cooling element or jacket is cooled intermittently to provide intermittent or pulsed chilling of the liquid to achieve the formation and subsequent incipient remelting of the crystal mass as already described.

In this last embodiment of the invention, it will be clear that a separate feed of liquid metal is required.

The invention also provides apparatus for carrying out the method just described, said apparatus comprising vessel to contain a column of liquid metal, heating means arranged so as to provide a relatively hot zone and a relatively cool zone in said column, means to first chill at least a part of the liquid in the cool zone to form a coherent mass of crystals and then to allow incipient melting in the mass to release crystals from the mass to thereby form a slurry of the crystalline metal in the liquid metal, and means to withdraw liquid metal from the hot zone.

The vessel may be of constant cross section, or may be uniformly tapered to be narrowest in the vicinity of the cool zone and widest in the vicinity of the hot zone. More preferably, the vessel tapers outwards more rapidly in the vicinity of hot zone than elsewhere.

Preferably also, the heating means comprises intrusive heating elements or a heated section of the vessel in the hot zone.

The apparatus may also include means for intermittently producing small relative motion of the crystals and the liquid in the column, by movement of either the crystal mass or the liquid. This may be achieved, for example, by raising and lowering the level of the contents of the vessel, this procedure being referred to hereinafter as "pulsing".

The means for chilling the liquid may, as already indicated, comprise any suitable device which, at intervals, will introduce into the cool zone of the column preformed individual ingots of the feed metal. In the crudest form of the apparatus, of course, the ingots may simply be inserted manually, but in more sophisticated arrangements, the apparatus may include means for casting such ingots and/or suitable machinery for inserting the ingots into the column.

Alternatively, the chilling means may comprise means for introducing a continuous ingot of the feed metal into the cool zone of the column, such introduction being either by continuous or stepwise movement of the ingot. Thus, in this form, the apparatus may also include means for casting the impure feed metal into a continuous ingot, and means for feeding the ingot into the cool zone of the column. In this arrangement it will be convenient, therefore, to arrange the continuous casting apparatus and the liquid column in a linear arrangement.

In a further embodiment of the apparatus, the chilling means comprises an intrusive cooling element which is partly or wholly immersed in the column liquid in the cool zone. Such an element may conveniently be of the cold finger type, that is a hollow closed tubular body having means for introducing a cooling fluid into the interior of the body and means for allowing the fluid to escape from the body after it has performed its cooling function. This and many other equivalent arrangements are well-known per se in the chemical and chemical engineering arts.

Whichever chilling means is used, it is desirable that the chilling element or ingot made to vibrate longitudinally, i.e. in a direction parallel to the column and/or to have a rotating or circulatory motion about the lengthwise axis of the column.

Further aspects and features of the method and apparatus of the invention will now be described by reference to specific embodiments depicted in the accompanying diagrammatic drawings, in which.

Figure 1:
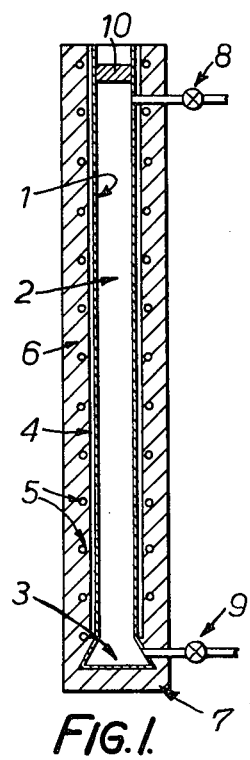
FIG. 1 shows a simple laboratory form of the apparatus in which crystal formation is by manual addition of preformed ingots.

The apparatus of FIG. 1 consists of a cylindrical refining vessel comprising a stainless steel tube 1 arranged vertically and consisting of a refining section 2 and a melting section 3. Tube 1 is surrounded by a Pyrex glass tube 4 which is wound with an electrical heating element 5. The vessel is encased in a thermal insulating layer 6.

The melting section 3 flares outwardly at its base and a heating element (not shown) is provided to heat the base 7 of the section 3. Outlets 8 and 9 are provided at the top and bottom respectively of the vessel for tapping off the contents of the vessel as required. A layer of silicone oil 10 floats on top of a liquid metal in the column to minimise oxidation of the metal in the column.

Operation of the apparatus of FIG. 1 is described in Example 1 hereinafter.

Figure 2:
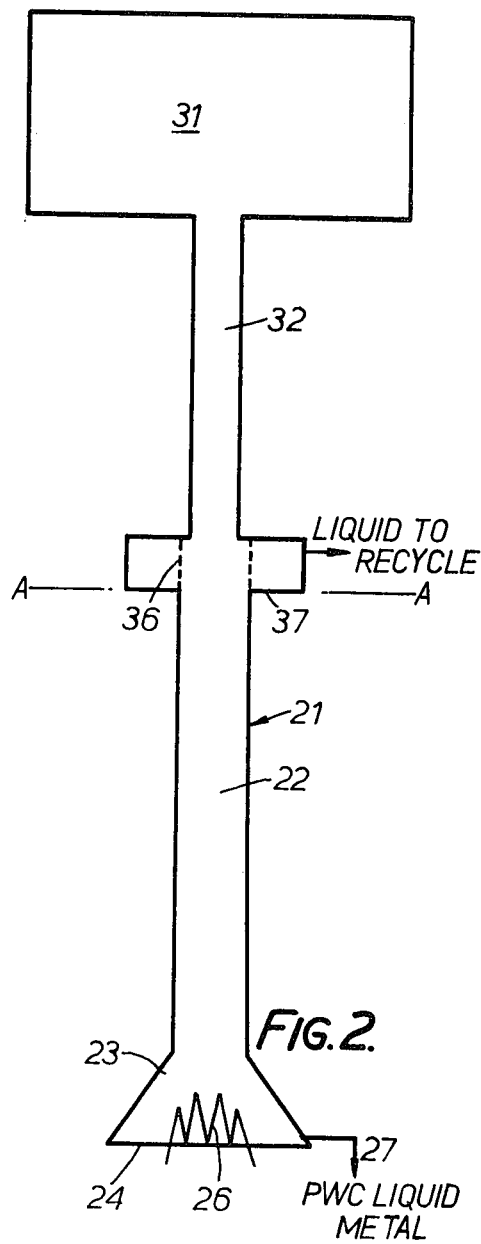
FIG. 2 shows an apparatus involving continuous ingot formation.

In FIG. 2, the part of the apparatus below the line A—A is common to the apparatus as described in FIGS. 2, 3 and 4. It consists of a columnar refining vessel 21, arranged vertically and consisting of a refining section 22 and a melting section 23. Both sections 22 and 23 are of circular cross-section which increases towards the bottom of the section, but the melting section 23 flares more rapidly than section 22. A heating element 26 is located in the base 24 of section 23 and intrudes into the interior of the section. As illustrated the section 23 has outlet 27 for liquid metal.

The part of the apparatus above line A—A in FIG. 2 is associated with the continuous ingot production and melting, and the withdrawal of liquid from section 22 of vessel 21 for recycling. The apparatus consists of a continuous ingot casting machine generally indicated at 31, which may be of any suitable known type. The outlet conduit 32 of the casting machine 31 is coaxially connected to a perforated section 36 which forms the upper part of the wall of the refining section 22 of vessel 21. The perforated section 36 is surrounded by a heated gallery 37 from which liquid metal may be recirculated if required to the casting machine 31 (by means not shown).

In use the continuously cast ingot of metal from the machine 31 provides the source of feed material for refining and simultaneously provides the force necessary for pushing the ingot into the refining vessel 21. The cold ingot of feed metal after leaving the continuous casting machine 31 through conduit 32 passes into the top of the crystal slurry column contained in the vessel 21. Here the cold metal chills the slurry and in so doing becomes cooled with a thick coherent layer of crystals. As the ingot continues to move downwards towards the hotter zone of the column, the crystal layer sloughs off the ingot and disintegrates into a slurry of crystals. Still further down the column the ingot itself undergoes partial remelting and disintegration to release more crystals and liquid as feed to the column.

As it is desirable to produce an ingot which will readily disintegrate under these latter conditions it is undesirable to produce homogenous sound billets in the casting machine. It is, in fact, preferred to operate the casting machine in such a way that a defective ingot is produced which contains many defects such as layers, cold-shuts and the like.

The crystals thus produced at the top of the refining section 22 continue to move down through the section while reflux liquid is displaced upwards past the crystals. Ultimately the crystals, which have been purified by this reflux process are melted in section 23 and part of the now pure liquid metal is tapped off from the base of the section 23. The impure reflux liquid discharges into the gallery 37.

Figure 3:
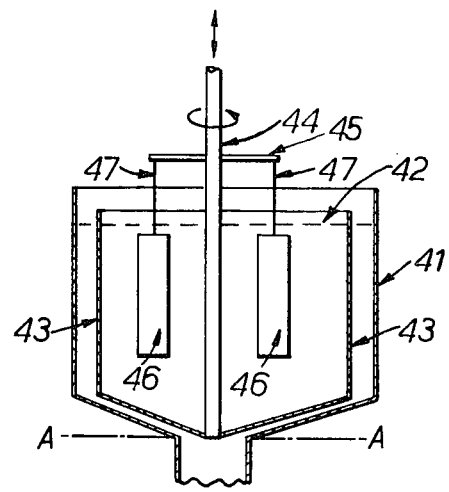
FIG. 3 shows a modification of the apparatus of FIG. 2, for production of crystals by individual ingots.
Figure 4:
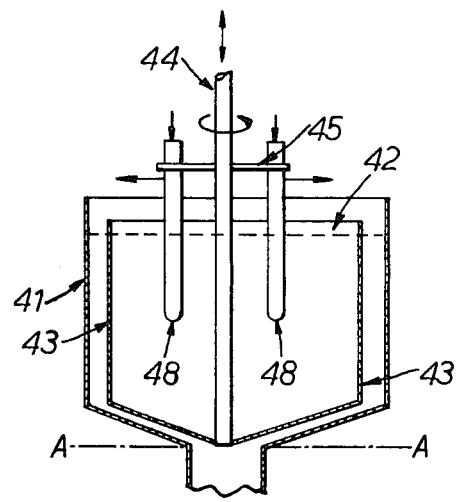
FIG. 4 shows another modification of the apparatus of FIG. 2, for production of crystals by intrusive cooling elements.

The apparatuses of FIGS. 3 and 4 have a number of common integers which are numbered accordingly. In FIGS. 3 and 4 the portion of the apparatus shown above the line A—A in FIG. 2 is replaced by an externally heated tank 41 which is of larger diameter than the vessel 21 and in which the formation of crystals takes place. The level of the crystal/liquid metal slurry in the tank 41 is shown by the line 42. The tank 41 is provided with an impeller type stirrer, two arms of which are shown at 43, which is supported on a central shaft 44. The shaft 44 also supports a cross arm 45 from which (in FIG. 3) precast ingots 46 are supported by wires 47 cast into the ingots. The shaft 44 is provided with means (not shown) to provide for rotation of the shaft and its attachments and also for vertical oscillation of the shaft.

Figure 5:
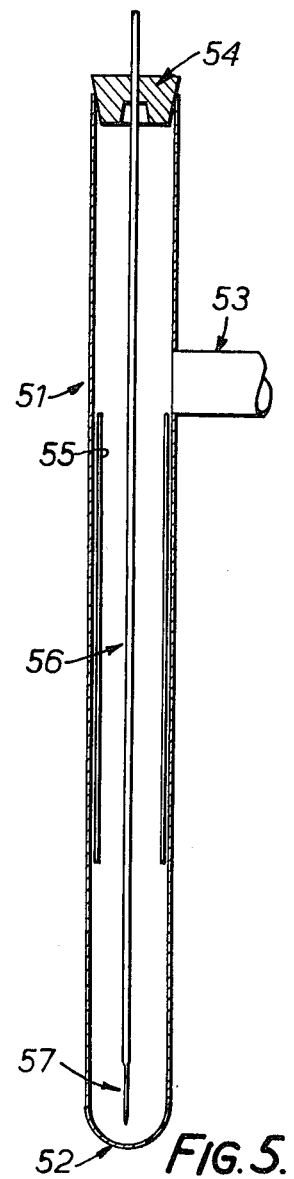
FIG. 5 shows the intrusive cooling element of FIG. 4 in detail.

In FIG. 4, instead of the ingots 46, the cross arm 45 supports a number of intrusive cooling elements generally designated as 48 and shown in detail in FIG. 5. The intrusive elements 48 are provided with means (shown in FIG. 5) by which the elements can be intermittently chilled and then allowed to reheat.

In each instance the introduction of the cold ingots 46 or the chilling of the elements 48 results in the formation of a layer of crystals as previously described in relation to FIG. 2. The reheating of the ingots 46 or elements 48 then results in sloughing off of the crystals with the formation of the required slurry. In the case of FIG. 3, the ingots themselves then subsequently become partially remelted and disintegrated to provide feed metal for the process.

In the case of FIG. 4, feed metal is added separately either to the tank 41 (by means not shown) or else by injection of liquid feet metal, or a preformed slurry of crystals and liquid formed from the feed metal, into an appropriate level of the vessel 21.

FIG. 5 shows a typical intrusive cooling element which has been used experimentally in the apparatus of FIG. 1 and which, with suitable modifications as to scale, can be used in the apparatus of FIG. 4. In FIG. 5 the cooling element consists of a steel tube 51 which is closed as its bottom end 52. Tube 51 is provided with a side arm 53 and is closed at the top by a resilient sealing plug 54. A part of the interior of the tube 51 is insulated by a sleeve 55 of insulating material, preferably fused silica. A narrow bore tube 56 is inserted through the seal 54 and extends near to the bottom 52 of the tube 51. A very fine tube 57 extends from the end of the tube 56 almost to the bottom 52 of the tube 51. By way of example, the tubes 56 and 57 can be coarse and fine hypodermic needles respectively.

The tube 56 is connected to a positive displacement metering pump which, at predetermined intervals, supplies water to the tube which emerges from the fine tube 57 in a fine spray and impinges on the inside of the tube 51. The walls of the tube are thereby cooled and formation of crystals occurs on the outer walls of the tube. Steam produced by the evaporation of the water emerges through the side arm 53. The insulating sleeve 55 prevents excessive chilling of the tube 51 over that portion of the tube which passes through the surface of the slurry in tank 41. This results in favourable modification of the shape of the crystal mass which forms around the cooling element.

In a typical arrangement, water is introduced into the cooling element over a period of 20 seconds to 1 minute. Over the next 2 to 4 minutes the crystal mass thus formed sloughs off the element and the cycle is then repeated.

Each of the apparatus as described above has the capacity to produce all, or almost all, of the input metal as final product. In the case of the embodiments employing individual ingot feed, each ingot can produce more than its weight of crystals. For example, 1 ton of lead at room temperature has to have 1¾ times its latent heat of fusion requirements in order to have its temperature raised to the melting point, i.e. 1 ton of lead at room temperature can product 2¾ tons of crystals. Thus, for example, if 1 ton of impure lead is to be refined to yield 0.95 tons of pure metal (from the base of the vessel) and 0.05 tons of impure liquid (from the top), the addition of lead at room temperature would enable up to 1.75 tons of reflux liquid to be used for purification with the vessel. The extent of reflux liquid made and used per ton of metal produced can be controlled in two ways. Firstly, by controlling the temperature of the solid below its melting point, i.e. the lower the temperature of the solid ingots added, the greater the amount of reflux liquid produced. Secondly, if the metal to be refined exists in the liquid state, the extent of reflux can be controlled by freezing only a fraction of the liquid as ingots, and adding the cold ingots and the remaining liquid directly to the crystal forming tank. The higher the fraction of liquid cast as ingots, the higher the extent of reflux liquid formation. Consider, for example, the refining of one ton of impure liquid lead (which exists just above its melting point) into 0.95 tons of refined metal and 0.05 tons of impure metal. Suppose 0.50 tons of the liquid is cast into ingots and cooled to room temperature (prior to crystal making) while the other 0.50 tons is added as liquid to the crystal tank. The addition of the 0.50 tons of the cold ingots to the column will produce 1.375 tons of crystals per ton of the original liquid. Since the corresponding production of refined metal is 0.95 tons, the amount of reflux liquid formed is 0.425 tons, and the reflux ration is 0.447.

Similar control can be exercised when using continuous ingot feed. Where crystal formation is carried out using an intrusive cooling element, control is even more readily achieved by simply varying the length of the cooling fluid injection period and/or the frequency of the fluid injection.

A typical procedure for continuous reflux refining of metals using solid individual ingots to produce crystals is described below, together with examples of the results which can be obtained.

EXAMPLE 1

The apparatus of FIG. 1 was used. The overall height of the liquid column was 154 cm and the diameter was 12.1 cm. The heater winding 5 was rated at approximately 200 watts and the base heater at about 1 kw (maximum).

The general method of operation for lead refining is as follows

Prior to operation, the apparatus is filled with the alloy to be refined. The power inputs to the side heater 5 and the base heater are adjusted to melt the alloy to maintain the temperature of the alloy just above the melting point of pure lead, i.e., about 340° C. This represents the standby condition of the apparatus. The silicone oil layer (10) is added.

Crystals are next made at the top by inserting cold feed ingots, previously cast with a wire insert and cooled to room temperature. A typical ingot is of square cross section (2.5 cm side), 22 cm long, and weighs about 1.7 kg. The base heater is turned up slightly (from 350 to 490 watts) while the column is filled as rapidly as possible with crystals, while removing excess liquid through the top tap 8. Once the column is full of crystals, the power input to the base heater is stepped up gradually to the final running setting, while operating as total reflux, i.e. with no product being taken from the bottom tap 9. The starting up procedure takes about two hours, after which product is taken from the top and the base of the column in the ratio of about one to nine. Running is continued while maintaining the column full of crystals at all times and the level of the silicone oil/lead surface at a near constant height.

Typical results achieved are shown in Table 1.

TABLE 1

| | Impure Lead Composition: 1700 ppm Ag. 300 ppm Bi. | | | | | | Bottom |
|---|---|---|---|---|---|---|---|
| | Power Input at base (watts) | Reflux ratio | Analyses (ppm) | | | | production rate (kg/hr) |
| Time (minutes) | | | Top | | Bottom | | |
| | | | Ag | Bi | Ag | Bi | |
| 0 | 490 | Total | | | 1340 | 196 | |
| 30 | 490 | " | | | 54 | 95 | |
| 70 | 730 | " | 10200 | 540 | 4.5 | 67 | |
| 120 | 850 | " | | | 1.2 | 57 | |
| 150 | 850 | 1.86 | | | 1.2 | 57 | 31 |
| 210 | 850 | 1.86 | | | 1.9 | 67 | 31 |
| 340 | 850 | 1.86 | 14700 | 890 | 0.83 | 87 | 31 |

Using the apparatus described in Example 1 and employing similar techniques, with appropriate modifications as to temperatures and power inputs the following results were obtained.

EXAMPLE 2

For an impure tin metal feed containing 1.36% lead and 0.06% bismuth, with a reflux ratio of 1.06, the lead and bismuth in the top stream were 5.7% and 0.21% respectively and in the bottom stream, 0.040% and 0.006% respectively.

EXAMPLE 3

For the refining of zinc containing 0.1% lead and 0.05% cadmium, a refined product containing less than 1 ppm of lead and less than 5 ppm of cadmium was produced. The top stream contained 0.6% Pb and 0.3% Cd.

EXAMPLE 4

Impure aluminium containing as impurities mostly iron and silicon amounting to 0.2 percent in total was refined to yield purified aluminium containing 0.001 percent of silicon and iron. It was found that the addition of small amounts of sodium were effective in reducing the size of the aluminium crystals formed, and enhancing the extent and speed of the refining operation.

The claims defining the invention are as follows:

1. A method for the continuous purification of an impure metal which is hypoeutectic with respect to the pure metal sought, said method comprising providing a column consisting of a slurry of metal crystals in liquid metal, said column having a relatively cool zone and a relatively hot zone at which almost all of the heat input into the column is supplied, and a continuous temperature gradient between said zones; the temperature of the cool zone being such as to permit coexistence of liquid and crystalline metal, and said hot zone being at a temperature sufficient to melt the crystals; chilling a portion of the column in the said cool zone to form a coherent mass of crystals of the metal then allowing incipient melting in the mass to occur to release crystals from the mass into the column of the crystals in the liquid metal in the cool zone of said column; transporting the crystals through the temperature gradient and into the hot zone, wherein melting of the crystals occurs and the hot zone thereby becomes enriched with the pure liquid metal; continuously supplying impure feed metal to the column and continuously withdrawing a portion of the pure liquid metal from the hot zone; the conditions being such that, over any given interval, the weight of crystals formed by chilling is greater than the weight of feed metal added.

2. A method as claimed in claim 1, and further including the steps of supplying impure feed metal to the column and continuously withdrawing a portion of the pure liquid metal from the hot zone.

3. A method as claimed in claim 1, wherein the crystals are produced by introducing into the cooler part of the column a massive body of the feed metal.

4. A method as claimed in claim 3, wherein the metal body is an ingot of the feed metal and has a microsegregated structure.

5. A method as claimed in claim 3, wherein the solid feed metal is introduced in the form of discrete ingots at intervals whereby introduction of each ingot causes production of crystals and then the ingot itself is in turn partially remelted to release further crystals, and to provide all or part of the feed metal to the column.

6. A method as claimed in claim 3, wherein the solid feed metal is introduced in the form of a continuous ingot, whereby the stages of crystal formation and partial remelting of the column liquid, and subsequent partial remelting of the ingot occur successively as the ingot progresses into the column.

7. A method as claimed in claim 6, wherein the continuous ingot is introduced into the column in a stepwise fashion.

8. A method as claimed in claim 1, wherein the column is chilled to provide crystals by an intrusive cooling element immersed in the column.

9. A method as claimed in claim 8, wherein the cooling element is cooled intermittently to provide intermittent chilling of the column whereby alternate formation and subsequent incipient remelting of the crystal mass is achieved.

10. A method for carrying out reflux refining of an impure metal which is hypoeutectic with respect to the pure metal sought in a column said method comprising maintaining the column full of a slurry of suitable metal crystals and liquid metal; maintaining a temperature gradient along the length of the column, generating within the column crystals of suitable size, shape and composition by chilling the contents of the column near the cooler end of the column to form a coherent mass of crystals then allowing incipient melting in the mass to occur to release crystals from the mass into the column; transporting the crystals axially towards the hotter end of the column where almost all of the heat input to the column is supplied, thereby causing a displacement of liquid metal in the opposite direction to the movement of crystals; withdrawing purified liquid metal from the hotter end of the column, while withdrawing a smaller proportion of a liquid alloy enriched in impurities from the cooler end of the column; the feed metal being added at the cooler end or at an intermediate point in the column the conditions being such that, over, any given interval, the weight of crystals formed by chilling is greater than the weight of feed metal added.

11. A method as claimed in claim 10, wherein the crystals in the slurry are generated by partial remelting of the crystalline mass produced by chilling of a liquid metal containing impurities which give rise to dendritic segregation on freezing to produce inter-dendritic volumes of a lower melting alloy composition which melts during the partial remelting step to release solid crystals of slightly higher melting point into the column.

12. A method as claimed in claim 10, wherein the crystals are produced by introducing into the cooler part of the column a massive body of the feed metal.

13. A method as claimed in claim 12, wherein the metal body is an ingot of the feed metal and has a microsegregated structure.

14. A method as claimed in claim 12, wherein the solid feed metal is introduced in the form of discrete ingots at intervals whereby introduction of each ingot causes production of crystals and then the ingot itself is in turn partially remelted to release further crystals, and to provide all or part of the feed metal to the column.

15. A method as claimed in claim 12, wherein the solid feed metal is introduced in the form of a continuous ingot, whereby the stages of crystal formation and partial remelting of the column liquid, and subsequent partial remelting of the ingot occur successively as the ingot progresses into the column.

16. A method as claimed in claim 15, wherein the continuous ingot is introduced into the column in a stepwise fashion.

17. A method as claimed in claim 10, wherein the column is chilled to provide crystals by an intrusive cooling element immersed in the column.

18. A method as claimed in claim 17, wherein the cooling element is cooled intermittently to provide intermittent chilling of the column whereby alternate formation and subsequent incipient remelting of the crystal mass is achieved.

* * * * *